Figure 1:
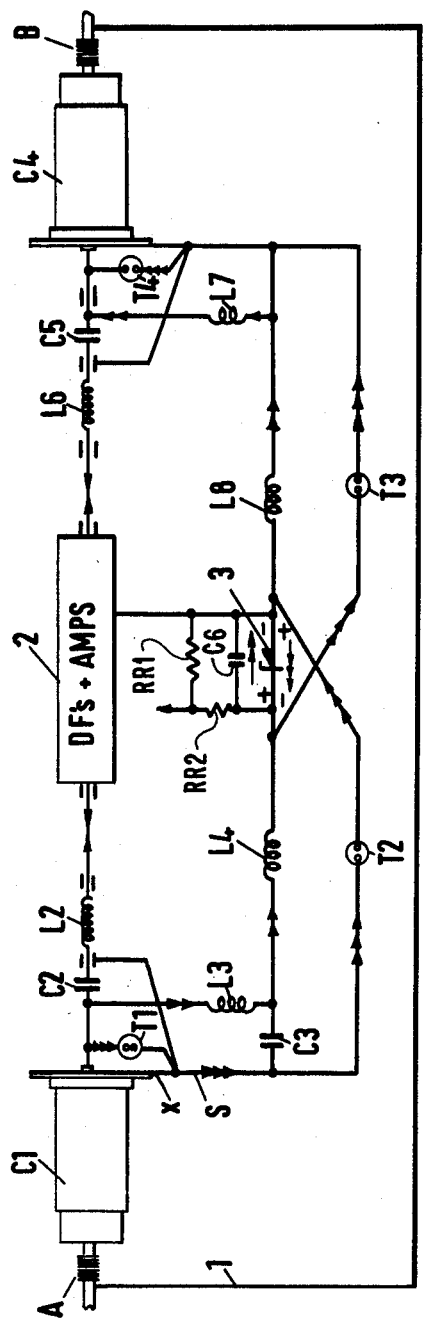

United States Patent [19]

Foster

[11] 4,110,570

[45] Aug. 29, 1978

[54] SURGE PROTECTION DEVICE FOR REPEATER

[75] Inventor: Basil Bernard Foster, London, England

[73] Assignee: International Standard Electric Corporation, New York, N.Y.

[21] Appl. No.: 793,675

[22] Filed: May 4, 1977

[30] Foreign Application Priority Data

May 25, 1976 [GB] United Kingdom ............... 21637/76

[51] Int. Cl.² ............................................. H04B 3/44
[52] U.S. Cl. ................................. 179/170 J; 361/119
[58] Field of Search ................ 179/170 R, 170 J, 184; 330/207 P; 361/111, 119

[56] References Cited

U.S. PATENT DOCUMENTS

| | | | |
|---|---|---|---|
| 3,535,474 | 10/1970 | Duimelaar | 179/170 J |
| 3,868,484 | 2/1975 | Bolton et al. | 179/170 J |
| 3,980,973 | 9/1976 | Hecken | 179/170 J |
| 4,024,356 | 5/1977 | Duimelaar | 179/170 J |

Primary Examiner—Kathleen H. Claffy
Assistant Examiner—Randall P. Myers
Attorney, Agent, or Firm—James B. Raden; Marvin M. Chaban

[57] ABSTRACT

A repeater suitable for use in submerged signal transmission systems, the repeater having inherent protection against power surges. The repeater includes a signal path including an amplifier and a separate path for powering the amplifier. The power path includes a zener diode and gas discharge tubes. One or more tubes are connected to conduct on a power surge to reverse bias the zener diode and effectively switch the diode off to protect the circuit during the incidence of the power surge.

5 Claims, 2 Drawing Figures

SURGE PROTECTION DEVICE FOR REPEATER

This invention relates to transmission systems particularly but not exclusively submerged transmission links.

In submerged transmission links provision must be made to protect the equipment against surge voltages which may occur for example if the cable in the transmission link is fouled by a ship's anchor.

It is known to use gas discharge tubes connected across those items of the equipment which are to be protected. In particular the repeater will have a signal path and signal amplifier for carrying and amplifying the information signals and a separate power supply path through which the power will pass. Power separating filters are used to separate the power from the signal path into the power supply path and we have, in the past, utilised gas discharge tubes connected so that surge power will bypass these filters and the signal path.

However it is known to use one or more zener diodes in the power transmission path for developing a voltage for supplying the signal amplifier with power via power supply circuits, and it has been found that whilst the surge protection devices protect the power separating filters and divert the surge power from the transmission path, the components of the amplifier can become damaged under certain conditions causing possible failure of the amplifier.

It is an object of the present invention to solve this problem.

According to the present invention there is provided a repeater for a transmission system, the repeater having a signal transmission path including an amplifier, a separate d.c. power transmission path, a voltage-developing-device arranged in the power transmission path for developing a unidirectional voltage to power the amplifier, a power separating filter for separating the power and the signal into the respective separate paths, and a surge protection device connected across the series combination of at least part of the respective power separating filter and the voltage developing device, whereby a power surge through the repeater will be carried by the surge protection device and the associated voltage will oppose said unidirectional voltage and change it to a value at which the amplifier will be switched off.

In order that the invention can be clearly understood reference will now be made to the accompanying drawings which show:

In FIG. 1, a repeater of a submerged transmission link, in partly schematic form, according to an embodiment of the present invention.

Figure 2:
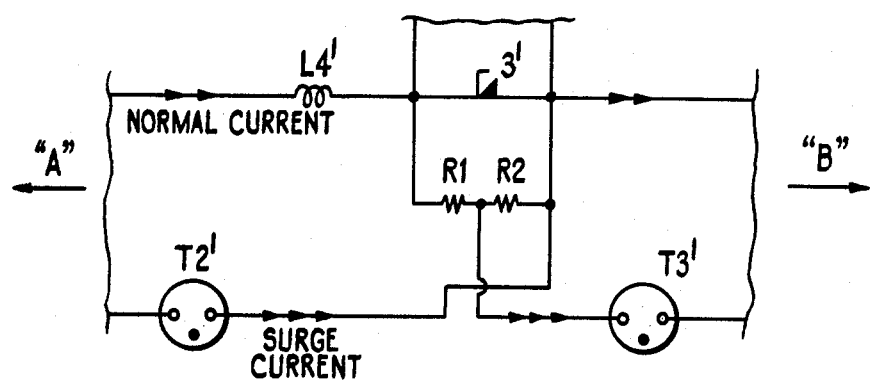

In FIG. 2, a second embodiment comprising a modification in the circuit of FIG. 1.

Referring to FIG. 1, there is shown schematically a repeater housing 1 connected to cables A and B in a transmission link. In the particular embodiment described the repeater is bi-directional, that is to say it handles signals transmitted both in direction A to B, and in the reverse direction B to A but the d.c. power is provided from A to B only. The repeater could alternatively be unidirectional. The incoming signal A to B together with the d.c. power passes through co-axial capacitor C1 whose counterpart for the other end of the repeater is capacitor C4. The capacitor C1 is connected between the outer cable conductor and the point x in the surge paths and blocks the high d.c. power voltage from the surge path. Capacitor C2 and inductor L3 combined with capacitor C1 provide a high pass filter to separate the information signals from the power. Inductors L4 and L8 carry normal d.c. power and capacitor C3 is a decoupling capacitor. The signal path (in this case bi-directional) is indicated by the single arrow head, the normal power supply path is indicated by the double arrow head and the surge power path is indicated by the triple arrow head. For the opposite direction of transmission the high pass filter is formed by inductor L7, capacitors C4 and C5.

Inductors L2 and L6 are longitudinal signal stopping coils and act to reduce the longitudinal currents passing along the filters and amplifiers from one end of the repeater to the other.

The block 2 contains directional filters and the signal amplifiers for both directions of transmission. A unidirectional voltage-developing-device 3, in this case a zener diode, produces a voltage drop sufficient to supply the amplifiers of the repeater. A resistor RR1 and capacitor C6 are connected in parallel with the zener diode and a series resistor RR2 is incorporated in the feed path. More than one zener diode could be incorporated depending on the required supply voltage for the amplifiers.

Four surge protection devices T1, T2, T3 and T4 in the form gas discharge tubes, are connected as shown. Tubes T1 and T4 shunt the surge power away from the signal path and into the surge power path and tubes T2 and T3 are connected across at least part of the power separating filters in series with the zener diode 3. Thus a power surge in the direction A to B will cause tube T1 to conduct and also tube T2. The normal zener voltage is in the direction of the double headed arrow immediately adjacent zener diode 3 but the surge will, owing to the connection of the tube T2, force the zener diode to conduct in the opposite direction thus rendering the zener voltage zero. Thus the power to the amplifier is effectively switched off and this protects the components (not shown in detail) of the amplifier from the surge. The power surge continues through the tube T3 and the tube T4 and into the cable in the direction B.

A modification of part of FIG. 1 is shown in FIG. 2. Here the surge protection device T3', corresponding to T3 in FIG. 1, is connected to a tapping point in an impedance network formed by a pair of resistors R1 and R2. The impedance network forms a "dummy" load across the zener diode. R1 and R2 could be 100 ohms total, but R1 and R2 are chosen to have individual values such that forward power surges and reverse surges have the minimum adverse effect on the repeater power supply. If R1 = 0 and R2 = 100 forward surges, that is to say surges from A to B, reverse the power through zener diode 3'. This is desirable. But reverse surges will enhance the forward voltage across zener diode 3', and this could be dangerous. Hence a compromise tap i.e. ratio of R1 to R2, can be found so that both forward and reverse surges can be tolerated. The value of R1 in the embodiment described must be greater than R2 and with the preferred total value of 100, R1 must be greater than 50 and R2 must be less than 50. In general the ratio of R1 to R2 must be greater than unity.

FIG. 2 only shows a modification to FIG. 1. All other components would be as shown in FIG. 1.

The dummy load is effective to pass d.c. current through the power transmission path in the event that the zener diode will not. This is particularly the case at low current values such as may occur if the cable is broken and the dummy load enables the cable to be interrogated, for example to determine the location of the break.

I claim:

1. A repeater for a transmission system, the repeater comprising a signal transmission path and a separate d.c. power transmission path, an amplifier in said transmission path, a voltage-developing-device in the power transmission path for developing a unidirectional voltage to power the amplifier, a power separating filter for separating power applied to said repeater and signals transmitted to the repeater into the respective separate paths, at least part of the power separating filter and the voltage developing device comprising a series combination, a surge protection device connected across the series combination, whereby a power surge through the repeater will be carried by the surge protection device, and said device includes at least one gas discharge tube responsive to voltage associated with a power surge for switching said voltage to oppose said unidirectional voltage, whereby the unidirectional voltage is lowered to a value at which the amplifier will be switched off.

2. A repeater as claimed in claim 1, wherein said surge protection device includes a plurality of gas discharge tubes, certain of said tubes connected to shunt a power surge away from said signal path.

3. A repeater as claimed in claim 1, in which said switching means comprises a gas discharge tube in series with each zener diode.

4. A repeater according to claim 1, comprising an impedance network connected to the voltage developing device and having a tapping point, and a second surge protection device connected to the voltage developing device via the tapping point, whereby a surge in the opposite direction through the second surge protection device will tend to oppose said voltage and change it towards said value at which the amplifier will be switched off.

5. A repeater according to claim 4, wherein the impedance network forms a d.c. dummy load in parallel with the voltage developing device effective to pass d.c. current through the power transmission path in the event that the voltage developing device will not.

* * * * *